(12) United States Patent
Neelakantan et al.

(10) Patent No.: US 9,200,713 B2
(45) Date of Patent: Dec. 1, 2015

(54) VALVE CONFIGURED FOR REGULATING THE FLOW OF FLUID FROM A TRANSMISSION TO A COOLER

(75) Inventors: Vijay A. Neelakantan, Rochester Hills, MI (US); Xiujie Gao, Troy, MI (US); Patrick B. Usoro, Troy, MI (US); Alan L. Browne, Grosse Pointe, MI (US); Nilesh D. Mankame, Ann Arbor, MI (US); Nancy L. Johnson, Northville, MI (US); Shushan Bai, Ann Arbor, MI (US); Paul G. Otanez, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 846 days.

(21) Appl. No.: 13/309,850

(22) Filed: Dec. 2, 2011

(65) Prior Publication Data

US 2013/0139906 A1 Jun. 6, 2013

(51) Int. Cl.

| | |
|---|---|
| *F01P 7/02* | (2006.01) |
| *F01M 5/00* | (2006.01) |
| *F01P 11/08* | (2006.01) |
| *F28D 7/10* | (2006.01) |
| *G05D 23/00* | (2006.01) |
| *F16K 11/07* | (2006.01) |
| *F16K 31/00* | (2006.01) |
| *F16H 57/04* | (2010.01) |

(52) U.S. Cl.
CPC ............ *F16K 11/07* (2013.01); *F16H 57/0413* (2013.01); *F16K 31/002* (2013.01); *Y10T 137/6416* (2015.04)

(58) Field of Classification Search
CPC ....... F16K 11/07; F16K 31/002; F16K 31/12; F16H 57/04; F16H 57/0413

USPC ......... 123/179, 196 AB, 41.33; 165/140, 297
See application file for complete search history.

(56) References Cited

U.S. PATENT DOCUMENTS

| | | | |
|---|---|---|---|
| 4,522,219 A | 6/1985 | Ohkata | |
| 5,890,509 A * | 4/1999 | Becker et al. | 137/115.26 |
| 5,908,098 A * | 6/1999 | Gorman et al. | 192/109 F |
| 7,997,505 B2 | 8/2011 | Martin et al. | |
| 2003/0098147 A1* | 5/2003 | Kemmerer et al. | 165/202 |
| 2003/0136855 A1* | 7/2003 | Brown | 236/101 R |
| 2005/0039719 A1* | 2/2005 | Moss | 123/196 AB |
| 2006/0108435 A1 | 5/2006 | Kozdras | |
| 2007/0164123 A1 | 7/2007 | Willers | |
| 2007/0295016 A1 | 12/2007 | Robin | |

(Continued)

FOREIGN PATENT DOCUMENTS

JP 2009275583 A 11/2009

*Primary Examiner* — M. Alexandra Elve
*Assistant Examiner* — Henry Crenshaw
(74) *Attorney, Agent, or Firm* — Quinn Law Group, PLLC (57) ABSTRACT

A transmission fluid circuit includes a transmission, a cooler, and a valve. The valve includes a housing, a spool and an actuator. The spool is movable inside the housing between a first position and a second position. The actuator includes a smart material configured to be activated in response to the temperature of the fluid exhibiting at least a first temperature such that the actuator is in a first state. The smart material is configured to be deactivated in response to the fluid being a sufficient number of degrees less than the first temperature such that the actuator is in a second state. The fluid flows from the housing to the transmission and from the transmission the cavity when the spool is in the first position. The fluid flows from the housing to the cooler and from the cooler to the transmission when the spool is in the second position.

18 Claims, 5 Drawing Sheets

(56) References Cited

U.S. PATENT DOCUMENTS

| | | | |
|---|---|---|---|
| 2008/0093066 A1* | 4/2008 | Bird et al. | 165/297 |
| 2008/0182709 A1 | 7/2008 | Hart et al. | |
| 2009/0229812 A1* | 9/2009 | Pineo et al. | 165/297 |
| 2010/0062890 A1 | 3/2010 | Shimizu | |
| 2010/0126594 A1 | 5/2010 | Sheppard | |
| 2010/0213401 A1 | 8/2010 | Martin et al. | |
| 2013/0042927 A1 | 2/2013 | Neelakantan et al. | |

* cited by examiner

VALVE CONFIGURED FOR REGULATING THE FLOW OF FLUID FROM A TRANSMISSION TO A COOLER

TECHNICAL FIELD

The disclosure relates to a transmission fluid circuit.

BACKGROUND

Vehicles typically include an engine and a transmission. To operate properly, the transmission requires a supply of fluid, such as conventional transmission oil. The fluid may be used for such functions as cooling and lubrication. The lubricating and cooling capabilities of transmission oil systems greatly impact the reliability and durability of the transmission. Additionally, multi-speed power transmissions require fluid for controlled engagement and disengagement, on a desired schedule, of the various torque transmitting mechanisms that operate to establish the speed ratios within the internal gear arrangement.

SUMMARY

A transmission fluid circuit is configured for regulating the flow of a fluid. The transmission fluid circuit includes a transmission, a cooler, and a valve. The transmission is configured for receiving and expelling the fluid. The cooler is configured for receiving and expelling the fluid to the transmission. The valve is configured for directing the flow of fluid received from the transmission to one of the transmission and the cooler. The valve includes a housing, a spool and an actuator. The housing defines a cavity which extends longitudinally between a first end and a second end. The cavity is configured for receiving and expelling the fluid. The spool is disposed in the cavity and is movable longitudinally therein between a first position and a second position. The actuator is configured to be operatively disposed in fluid communication with the fluid. The actuator is configured to regulate the flow of fluid into the cavity of the housing. The actuator includes a smart material which is configured to be activated in response to the temperature of the fluid exhibiting at least a first temperature such that activation of the smart material causes the actuator to be in a first state. The smart material is configured to be deactivated in response to the fluid being a sufficient number of degrees less than the first temperature such that the smart material causes the actuator to be in a second state. The fluid is permitted to flow from the cavity to the transmission and from the transmission the cavity when the spool is in the first position. The fluid is permitted to flow from the cavity to the cooler and from the cooler to the transmission when the spool is in the second position.

A transmission fluid circuit includes a transmission, a cooler, and a valve. The transmission is configured for receiving and expelling a fluid. The cooler is configured for receiving and expelling the fluid to the transmission. The valve is configured for directing the flow of fluid received from the transmission to one of the transmission and the cooler. A first fluid passage is disposed in fluid communication between the valve and the transmission. A second fluid passage is disposed in fluid communication between the housing and the first fluid passage. The valve includes a housing, a spool, and an actuator. The housing defines a cavity which extends longitudinally between a first end and a second end. The cavity is configured for receiving and expelling the fluid. The spool is disposed in the cavity and is movable longitudinally therein between a first position and a second position. The actuator is operatively disposed in the second fluid passage. The actuator is in fluid communication with the fluid and the actuator is configured to regulate the flow of fluid into the cavity of the housing. The actuator includes a smart material configured to be activated in response to the temperature of the fluid in the second fluid passage exhibiting at least a first temperature such that activation of the smart material activates the actuator. The smart material is configured to be deactivated in response to the fluid in the second fluid passage being a sufficient number of degrees less than the first temperature such that the smart material deactivates the actuator. The actuator permits the fluid to flow from the second fluid passage into the cavity when the actuator is activated such that the fluid in the cavity acts on the spool to move the spool from the first position to the second position. The fluid is permitted to flow from the cavity to the transmission and from the transmission the cavity when the spool is in the first position. The fluid is permitted to flow from the cavity to the cooler and from the cooler to the cavity when the spool is in the second position.

A transmission fluid circuit includes a transmission, a cooler, and a valve. The transmission is configured for receiving and expelling a fluid. The cooler is configured for receiving and expelling the fluid to the transmission. The valve is configured for directing the flow of fluid received from the transmission to one of the transmission and the cooler. A first fluid passage is disposed in fluid communication between the valve and the transmission. A second fluid passage is disposed in fluid communication between the housing and the first fluid passage. The valve includes a housing, a spool, a needle valve, and a wire. The housing defines a cavity which extends longitudinally between a first end and a second end. The cavity is configured for receiving and expelling the fluid. The first end of the housing defines a first inlet which provides fluid communication between the cavity and the second fluid passage. The spool is disposed in the cavity and is movable longitudinally therein between a first position and a second position. The needle valve is disposed in the second fluid passage and is configured to cover and uncover the first inlet to allow the fluid to flow from the second fluid passage into the cavity only when the needle valve uncovers the first inlet. The wire is disposed in the first fluid passage and is operatively attached to the needle valve where the wire is in fluid communication with the fluid. The wire includes a smart material which is configured to be activated in response to the temperature of the fluid in the second fluid passage exhibiting at least a first temperature. Activation of the smart material activates the wire and moves the needle valve to uncover the first inlet to allow the fluid to enter the cavity and act on the spool to move the spool from the first position to the second position. The smart material is configured to be deactivated in response to the fluid in the second fluid passage being a sufficient number of degrees less than the first temperature such that the smart material deactivates the wire and the needle valve covers the first inlet and fluid is prevented from entering the cavity from the first inlet and the spool moves from the second position to the first position. The fluid is permitted to flow from the cavity to the transmission and from the transmission to the cavity when the spool is in the first position. The fluid is permitted to flow from the cavity to the cooler and from the cooler to the transmission when the spool is in the second position.

The above features and advantages and other features and advantages of the present disclosure are readily apparent from the following detailed description of the best modes for carrying out the disclosure when taken in connection with the accompanying drawings.

DETAILED DESCRIPTION

Figure 1:
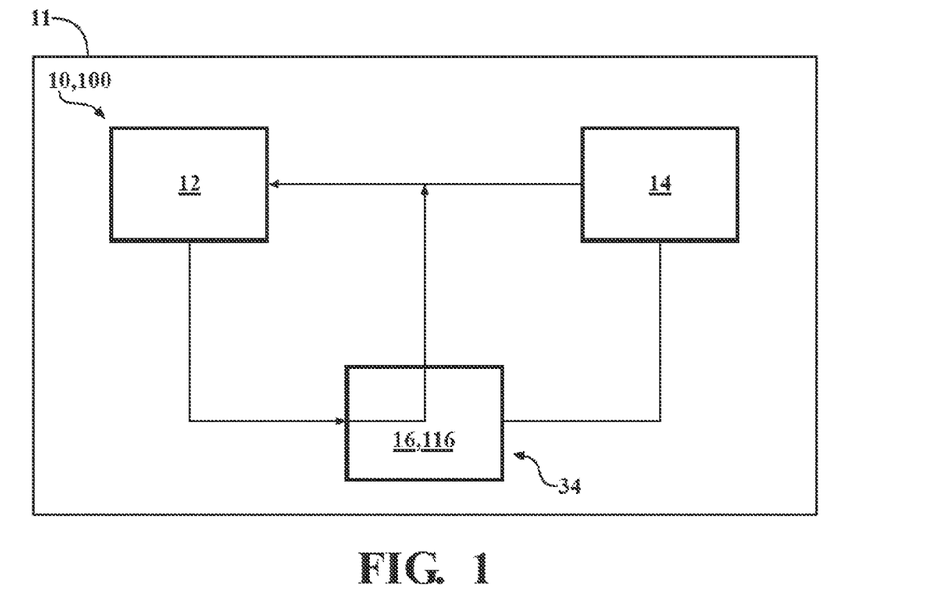
FIG. 1 is a schematic diagram of a transmission fluid circuit of a vehicle having a transmission, a cooler, and a valve in a first position such that fluid flows from the transmission, through the valve, and back into the transmission, bypassing the cooler.
Figure 2:
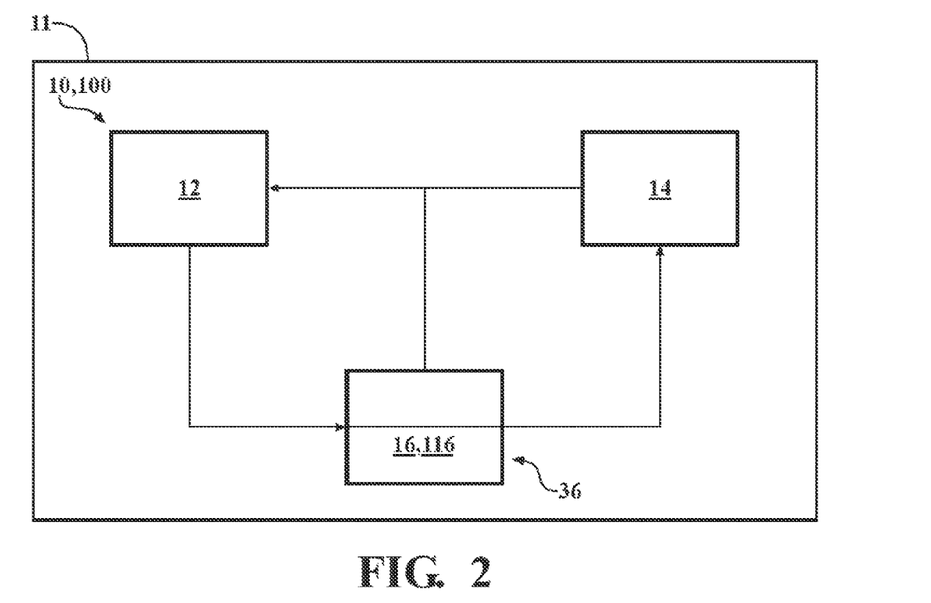
FIG. 2 is the fluid circuit of FIG. 1 with the valve in a second position such that fluid flows from the transmission, through the valve, through the cooler, and back into the transmission.

Referring to the Figures, wherein like reference numerals refer to like elements, a transmission fluid circuit 10 is shown generally at 10 in FIGS. 1 and 2. The transmission fluid circuit 10 includes a transmission 12, a cooler 14, and a valve 16. As will be explained in more detail below, the valve 16 is configured for regulating the circulation of a fluid 18 between the transmission 12 and the cooler 14. The fluid 18 may be an automatic transmission fluid (ATF) and the like. The transmission 12 may be an automatic transmission for a vehicle 11 which is configured for receiving and expelling the fluid 18.

The cooler 14 may be an automatic transmission fluid cooler 14 and the like. The cooler 14 is configured for receiving the fluid 18 from the valve 16 and expelling the fluid 18 to the transmission 12.

In order to cool the transmission 12 during operation, the valve 16 is configured to direct the flow of the fluid 18 from the transmission 12 to the fluid cooler 14 and from the cooler 14 to the transmission 12 when the fluid 18 being expelled from the transmission 12 is at least at a first temperature (FIG. 2). Likewise, when the fluid 18 being expelled from the transmission 12 is below the first temperature, the valve 16 directs the fluid 18 being expelled from the transmission 12, back into the transmission 12, bypassing the cooler 14 (FIG. 1). Therefore, the cooler 14 only operates when the fluid 18 is at least the first temperature, resulting in vehicle energy savings by preventing unnecessary operation of the cooler 14 at temperatures less than the first fluid temperature.

Figure 3:
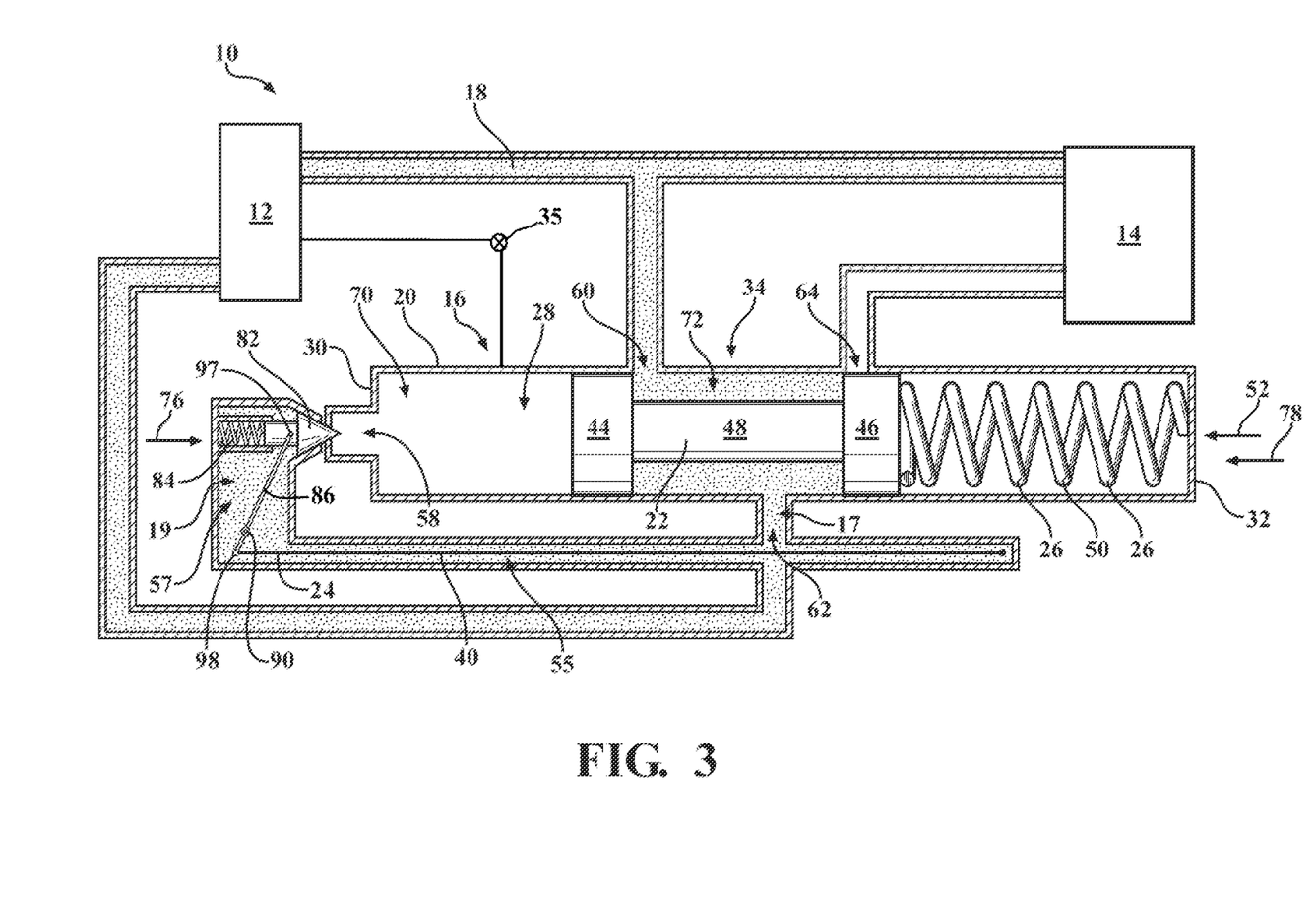
FIG. 3 is a schematic cross-sectional view of the first embodiment of the valve, shown in the first position.
Figure 4:
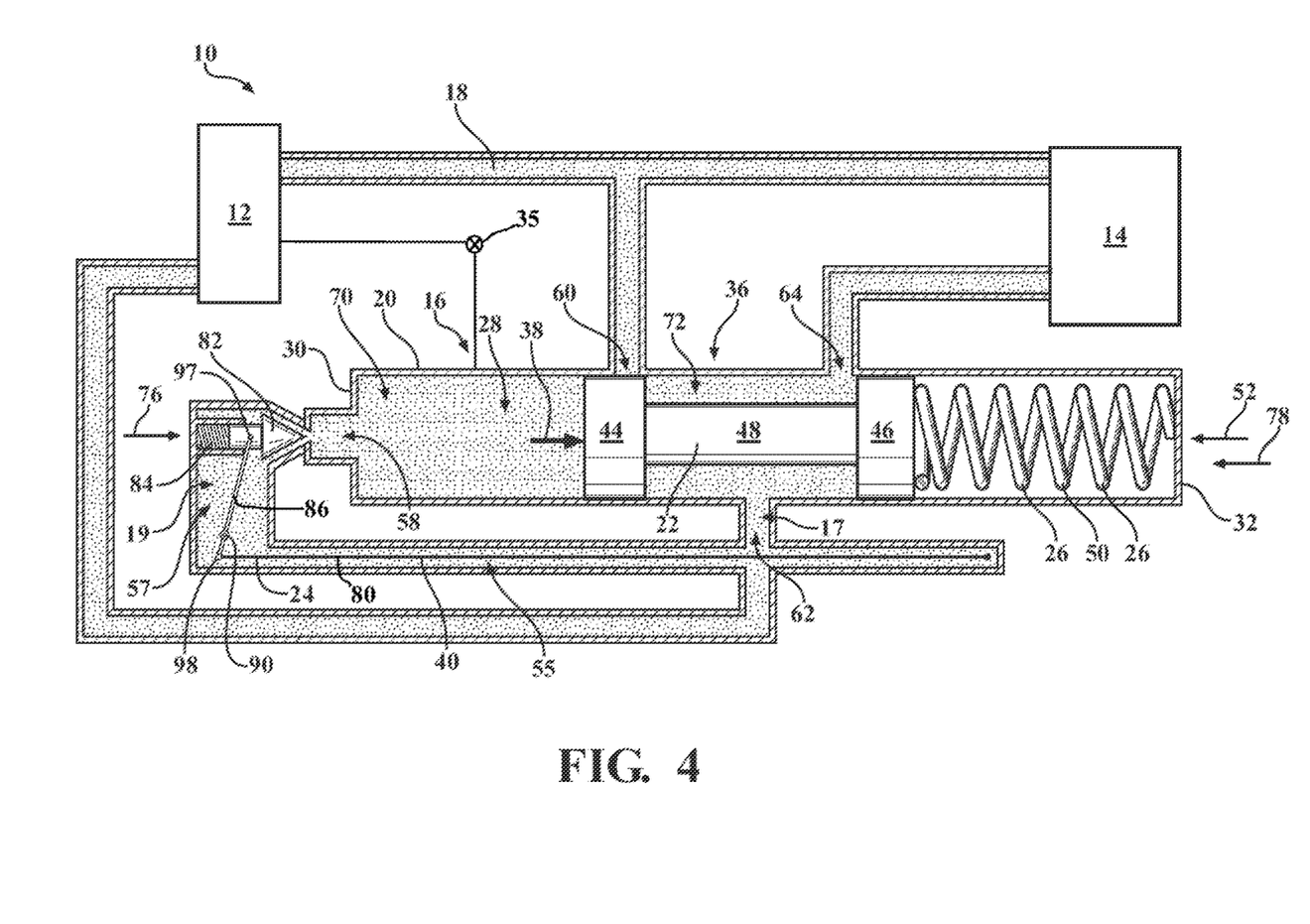
FIG. 4 is a schematic cross-sectional view of the valve of FIG. 3, shown in the second position.
Figure 5:
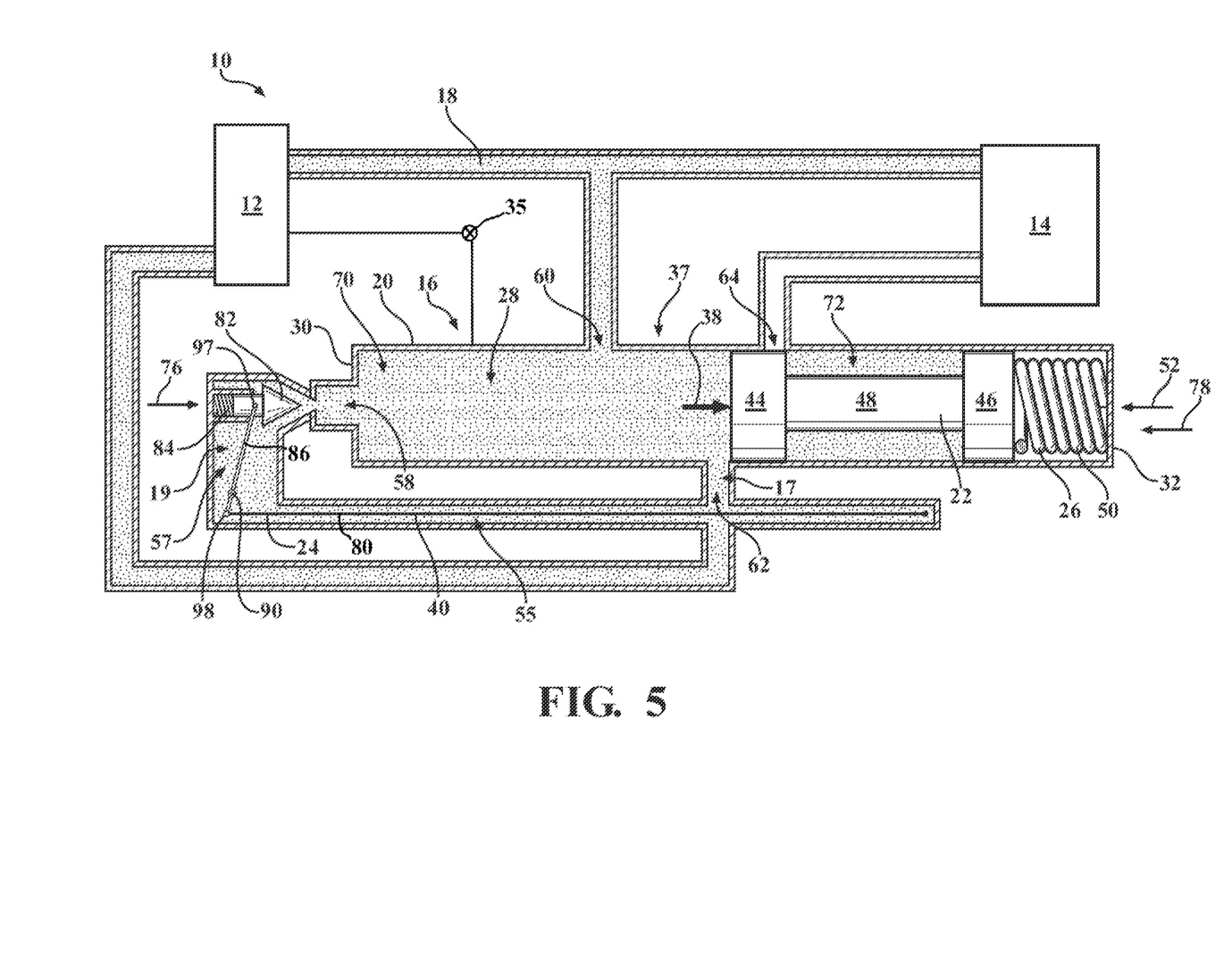
FIG. 5 is a schematic cross-sectional view of the valve of FIG. 3, shown in a third position.

Referring generally to FIGS. 3-5, the valve 16 includes a housing 20, a spool 22, an actuator 24, and a first biasing device 26. The housing 20 defines a cavity 28 which extends longitudinally between a first end 30 and a second end 32. The cavity 28 is configured for receiving and expelling the fluid 18. The spool 22 is disposed in the cavity 28 and is movable longitudinally therein between a first position 34 (FIG. 3), a second position 36 (FIG. 4), and a third position 37 (FIG. 5). The fluid 18 is permitted to flow from the cavity 28 to the transmission 12 and from the transmission 12 to the cavity 28 when the spool 22 is in the first position 34. The fluid 18 is permitted to flow from the cavity 28 to the cooler 14 and from the cooler 14 to the cavity 28 when the spool 22 is in the second position 36. Fluid is permitted to flow from the transmission 12 to the cavity 28 and from the cavity to the transmission 12 when the spool 22 is in the third position 37.

A first fluid passage 17 is disposed in fluid communication between the valve and the transmission 12. A second fluid passage 19 is disposed in fluid communication between the housing 20 and the first fluid passage 17. The first fluid passage 17 and the second fluid passage 19 are in fluid communication with the transmission 12.

The actuator 24 is in fluid communication with the fluid 18. The actuator 24 includes a smart material 40, which may be a shape memory alloy (SMA) material which is configured to be activated, i.e. to be in a first state, in response to the fluid 18 in the cavity 28 having at least the first temperature such that activation of the SMA material 40 activates the actuator 24. The SMA material 40 is configured to be deactivated, i.e., to be in a second state, in response to the fluid 18 in the cavity 28 having a sufficient number of degrees less than the first temperature such that the SMA material 40 deactivates the actuator 24. More specifically, the SMA material 40 exhibits a temperature hysteresis in its phase transformations. The magnitude of the hysteresis is typically between five degrees and forty degrees Celsius (C). The specific magnitude of the hysteresis in a particular application is a function of several parameters, including the material formulation of the SMA material 40 and the stress state of the SMA material 40.

The SMA material 40 has a crystallographic phase changeable between austenite and martensite in response to exposure to a temperature of at least the first temperature and a temperature below the second temperature, which is typically lower than the first temperature. As used herein, the terminology SMA refers to alloys which exhibit a shape memory effect. That is, the SMA material 40 may undergo a solid state phase change via atomic rearrangement to shift between a martensite phase, i.e., "martensite", and an austenite phase, i.e., "austenite". Stated differently, the SMA material 40 may undergo a displacive transformation rather than a diffusional transformation to shift between martensite and austenite. A displacive transformation is when a structural change occurs by the coordinated movement of atoms (or groups of atoms) relative to their neighbors. In general, the martensite phase refers to the comparatively lower-temperature phase and is often more deformable than the comparatively higher-temperature austenite phase. The temperature at which the shape memory alloy material begins to change from the austenite phase to the martensite phase is known as the martensite start temperature, $M_s$. The temperature at which the SMA material 40 completes the change from the austenite phase to the martensite phase is known as the martensite finish temperature, $M_f$. Similarly, as the SMA material 40 is heated, the temperature at which the SMA material 40 begins to change from the martensite phase to the austenite phase is known as the austenite start temperature, $A_s$. The temperature at which the SMA material 40 completes the change from the martensite phase to the austenite phase is known as the austenite finish temperature, $A_f$.

Therefore, the SMA material 40 may be characterized by a cold state, i.e., when a temperature of the SMA material 40 is below the martensite finish temperature $M_f$ of the SMA material 40. Likewise, the SMA material 40 may also be characterized by a hot state, i.e., when the temperature of the SMA material 40 is above the austenite finish temperature $A_f$ of the SMA material 40.

In operation, SMA material 40 that is pre-strained or subjected to tensile stress can change dimension upon changing crystallographic phase to thereby convert thermal energy to mechanical energy. That is, the SMA material 40 may change crystallographic phase from martensite to austenite and thereby dimensionally contract if pseudoplastically pre-strained so as to convert thermal energy to mechanical energy.

Conversely, the SMA material 40 may change crystallographic phase from austenite to martensite and if under stress thereby dimensionally expand.

"Pseudoplastically pre-strained" refers to stretching the SMA material 40 while in the martensite phase so that the strain exhibited by the SMA material 40 under that loading condition is not fully recovered when unloaded, where purely elastic strain would be fully recovered. In the case of SMA material 40, it is possible to load the material such that the elastic strain limit is surpassed and deformation takes place in the martensitic crystal structure of the material prior to exceeding the true plastic strain limit of the SMA material 40. Strain of this type, between those two limits, is pseudoplastic strain, called such because upon unloading it appears to have plastically deformed, but when heated to the point that the SMA material 40 transforms to its austenite phase, that strain can be recovered, returning the SMA material 40 to the original length observed prior to being subjected to any applied loading.

The SMA material 40 may have any suitable composition. In particular, the SMA material 40 may include an element selected from the group including cobalt, nickel, titanium, indium, manganese, iron, palladium, zinc, copper, silver, gold, cadmium, tin, silicon, platinum, gallium, and combinations thereof. For example, suitable SMA materials 40 may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations thereof. The SMA material 40 can be binary, ternary, or any higher order so long as the SMA material 40 exhibits a shape memory effect, e.g., a change in shape orientation, damping capacity, and the like.

In the embodiment shown in FIGS. 3-5, the SMA material 40 longitudinally contracts when activated. In the embodiment shown in FIGS. 6 and 7, the SMA material 40 is configured to longitudinally expand when activated.

The actuator 24 is activated by the temperature of the fluid 18 being at least equal to the first temperature. When the actuator 24 is activated, the actuator 24 permits the fluid 18 to act on the spool 22 to move the spool 22 from the first position 34, shown in FIG. 3, to the second position 36, shown in FIG. 4. The fluid 18 is permitted to flow from the cavity 28 of the valve 16 to the cooler 14, from the cooler 14 to the transmission 12, and from the transmission 12 to the cavity 28 when the spool 22 is in the second position 36. Further, as will be explained in more detail, if there is a fluid 18 blockage within the cooler 14 when the spool 22 is in the second position 36, pressure of the fluid 18 acting on the spool 22 increases until the spool 22 moves from the second position 36 to the third position 37, shown in FIG. 5. The fluid 18 is permitted to flow from the cavity 28 to the transmission 12 and from the transmission 12 to the cavity 28 when the spool 22 is in the third position 37.

The actuator 24 is deactivated by the temperature of the fluid 18 being a sufficient number of degrees less than the first temperature. When the actuator 24 is deactivated, the spool 22 moves from the second position 36 to the first position 34. When the spool 22 is in the first position 34, the fluid 18 is only permitted to flow from the cavity 28 to the transmission 12 and from the transmission 12 to the cavity 28, bypassing the cooler 14.

Referring now to the valve 16 shown in FIGS. 3-5, the actuator 24 is a wire 80 that includes the SMA material 40. The actuator 24 may also be a rod or any other actuator configured to longitudinally contract when actuated. The actuator 24 is operatively disposed within the second fluid passage 19. The actuator 24 permits the fluid 18 to flow from the second fluid passage 19 into the cavity 28 when the actuator 24 is activated such that the fluid 18 in the cavity 28 acts on the spool 22 to move the spool 22 from the first position 34 to the second position 36.

The spool 22 is disposed in the cavity 28 and is movable longitudinally therein between the first position 34, shown in FIG. 3, and the second position 36, shown in FIG. 4. The wire 80 is operatively disposed within the first fluid passage 17 and is configured to allow the fluid 18 to act on the spool 22. The spool 22 includes a first section 44, a second section 46, and an intermediate section 48. The first section 44 is longitudinally spaced from the second section 46. The intermediate section 48 connects the first section 44 to the second section 46. The first section 44 and the second section 46 are radially sized to fit within the cavity 28 such that the fluid 18 is prevented from passing within the cavity 28 between the first section 44 or the second section 46 and the housing 20. The intermediate section 48 is radially sized to be smaller than the first section 44 and second section 46 such that the fluid 18 is allowed to flow radially about the intermediate section 48, between the intermediate section 48 and the housing 20. The second fluid passage 19 opens to the first portion 70 of the cavity 28, defined between the first section 44, opposite the intermediate section 48, and the housing 20, such that the fluid 18 entering the first portion 70 of the cavity 28 acts on the first section 44 to apply a first force 38 in the first longitudinal direction 76. The actuator 24 is operatively disposed in the first fluid passage 17.

The second fluid passage 19 includes a first passage portion 55 and a second passage portion 57. The first passage portion 55 extends in generally parallel relationship to the housing 20 and is in fluid communication with the first fluid passage 17. The second passage portion 57 extends in generally perpendicular relationship to the first passage portion 55 and is in fluid communication with the first passage portion 55 and a first inlet 58. The smart material 40 is operatively disposed in the first passage portion 55.

The housing 20 defines the first inlet 58, a first outlet 60, a second inlet 62, and a second outlet 64 that are each in fluid communication with the cavity 28. The first inlet 58 is defined by the first end 30 of the housing 20 and selectively provides fluid communication from the transmission 12 to the first portion 70 of the cavity 28 that is defined between the first section 44 and the first end 30 of the housing 20, opposite the intermediate section 48. The second inlet 62 provides fluid communication from the first fluid passage 17 to a second portion 72 of the cavity 28 when the spool 22 is in the first position 34 or the second position 36, as shown in FIGS. 3 and 4, and from the first fluid passage 17 and the second fluid passage 19 to the first portion 70 of the cavity 28 when the spool 22 is in the third position 37, as shown in FIG. 5. The second portion 72 of the cavity 28 is defined between the first section 44 and the second section 46. The first outlet 60 provides fluid communication from the second portion 72 of the cavity 28 to only the transmission 12 when the spool 22 is in the first position 34, as shown in FIG. 3, or from the first portion 70 of the cavity 28 to only the transmission 12 when the spool 22 is in the third position 37, as shown in FIG. 5. The second outlet 64 provides fluid communication from the second portion 72 of the cavity 28 to the cooler 14 when the spool 22 is in the second position 36, as shown in FIG. 4. In the second position 36, once the fluid 18 passes through the cooler 14, the fluid 18 then flows to the transmission 12. More specifically, when the spool 22 is in the first position 34, shown in FIG. 3, the second section 46 of the spool 22 blocks the second outlet 64, while leaving the first outlet 60 open to allow fluid communication from the second portion 72 of the cavity 28 to the transmission 12. Likewise, when the spool 22 is in the second position 36, shown in FIG. 4, the first section 44 of the spool 22 blocks the first outlet 60, while leaving the second outlet 64 open to allow fluid communication from the second portion 72 of the cavity 28 to the cooler 14. Also, when the spool 22 is in the third position 37, shown in FIG. 5, the first section 44 of the spool 22 blocks the second outlet 64, while leaving the first outlet 60 open to allow fluid communication from the first portion 70 of the cavity 28 to the transmission 12.

The actuator 24 includes a needle valve 82 that is configured to close the first inlet 58 when the smart material 40 is deactivated. When the first inlet 58 is closed, the fluid 18 is prevented from flowing through the first inlet 58 from the second fluid passage 19 and into the cavity 28. Referring to FIG. 4, the needle valve 82 uncovers the first inlet 58 when the smart material 40 is activated such that the fluid 18 is permitted to flow through the first inlet 58 from the second fluid passage 19 and into the cavity 28.

The actuator 24 also includes a second biasing device 84 and a lever arm 86. The needle valve 82 may be operatively disposed between the second biasing device 84 and the first inlet 58. The second biasing device 84 continuously biases the needle valve 82 toward the first inlet 58. The lever arm 86 extends between a first lever end 97 and a second lever end 98. The lever arm 86 is pivotally connected to the needle valve 82, proximate the first lever end 97. The lever arm 86 is pivotally connected to the second fluid passage 19 at a pivot location 90, disposed between the first lever end 97 and the second lever end 98. The lever arm 86 is operatively attached to the wire 80, proximate the second lever end 98. The needle valve 82, the second basing device 84, and the lever arm 86 are operatively disposed in the second passage portion 57. When the wire 80 is actuated, the wire 80 contracts and pulls the second lever end 98, causing the lever arm 86 to rotate about the pivot location 90. As the lever arm 86 rotates about the pivot location 90, the lever arm 86 exerts a force in opposition to a force exerted by the second biasing device 84. The force exerted by the lever arm 86 overcomes the force exerted by the second biasing device 84 to compress the biasing device 84 and move the needle valve 82 to uncover the first inlet 58.

Referring specifically to FIG. 3, the fluid 18 is at a temperature that is a sufficient number of degrees less than the first temperature and the wire 80 is deactivated, such that the wire 80 is longitudinally extended. The extended wire 80 does not act on the lever arm 86. As a result, the second biasing device 84 biases the needle valve 82 to seal against the first inlet 58 and prevent the fluid 18 from entering the first portion 70 of the cavity 28 through the first inlet 58. The first biasing device 26 is operatively disposed in the cavity 28 between the second section 46 of the spool 22 and the housing 20. The first biasing device 26 may be a compression spring 50. The first biasing device 26 acts on the second section 46 of the spool 22 in a second longitudinal direction 78, opposite a first longitudinal direction 76, with a second force 52. When the spool 22 is in the first position 34, the needle valve 82 closes the first inlet 58, preventing the fluid 18 from entering the first portion 70 of the cavity 28. In this first position 34, an outlet valve 35, connecting the first portion 70 of the cavity 28 to a fluid reservoir of the transmission 12 is simultaneously opened. As a result, no fluid 18 acts on the first section 44. Therefore, the second force 52 acts in the second longitudinal direction 78 and there is no first force 38 acting in the first longitudinal direction 76, due to the absence of the fluid 18 acting on the first section 44 such that the spool 22 is maintained in the first position 34. In the first position 34, the fluid 18 flows out of the second portion 72 of the cavity 28, through the first outlet 60, and into the transmission 12. Therefore, in the first position 34, the fluid 18 is prevented from flowing from the cavity 28 and into the cooler 14. Additionally, the actuator 24, including the SMA material 40, are totally immersed in the flowing fluid 18 such that the temperature is even across the whole actuator 24 and always equal to the temperature of the fluid 18.

Referring to FIG. 4, the fluid 18 is at a temperature that is at least equal to the first temperature and the wire 80 is activated. Since the temperature of the fluid 18 is at least equal to the first temperature, the wire 80 is activated and longitudinally contracts to move the needle valve 82 to uncover the first inlet 58. Once the first inlet 58 is uncovered, the fluid 18 flows into the first portion 70 of the cavity 28, resulting in the first force 38 being applied to the first section 44 in the first longitudinal direction 76. As a result, the first force 38 is greater than the second force 52 of the first biasing device 26, acting on the second section 46 in the second longitudinal direction 78 such that the spool 22 is caused to move in the first longitudinal direction 76 and is maintained in the second position 36. Therefore, the first force 38 of the fluid 18 acting on the first section 44 of the spool 22 overcomes the second force 52 of the first biasing device 26 acting on the second section 46 of the spool 22 to move the spool 22 in the first longitudinal direction 76 from the first position 34 to the second position 36. In the second position 36, the fluid 18 flows out of the second portion 72 of the cavity 28, through the second outlet 64, and into the cooler 14. The fluid 18 that flows through the cooler 14 is cooled by the cooler 14 and then flows from the cooler 14, back into the transmission 12. When the spool 22 is in the second position 36, the first section 44 blocks the first outlet 60 such that the fluid 18 is prevented from flowing directly from the cavity 28 back into the transmission 12.

Additionally, referring to FIGS. 4 and 5, when the valve 16 is in the second position 36 (FIG. 4) and the cooler 14 becomes blocked, the spool 22 moves to the third position 37 (FIG. 5). More specifically, regardless of the temperature of the fluid 18, when the cooler 14 becomes blocked, the fluid 18 is prevented from flowing therethrough and the first force 38 acting on the first section 44 ends up increasing such that the first force 38 is greater than the second force 52. The increase of the first force 38 exerted on the first section 44 overcomes the second force 52, causing the spool 22 to move further in the first longitudinal direction 76 and into the third position 37. In the third position 37, the spool 22 blocks the second outlet 64 and the fluid 18 only flows from the first portion 70 of the cavity 28 to the transmission 12, bypassing the cooler 14.

Figure 6:
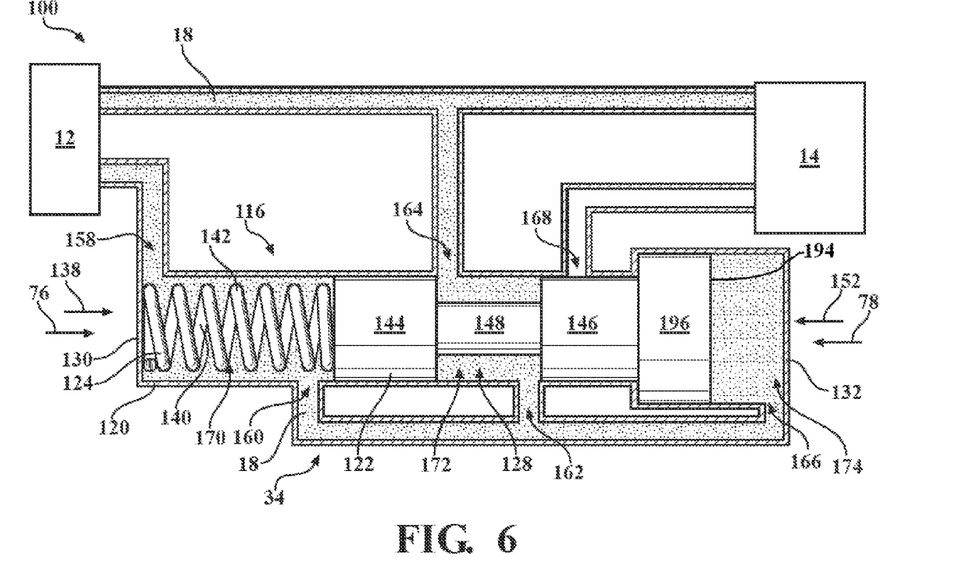
FIG. 6 is a schematic cross-sectional view of the second embodiment of the valve, shown in the first position.
Figure 7:
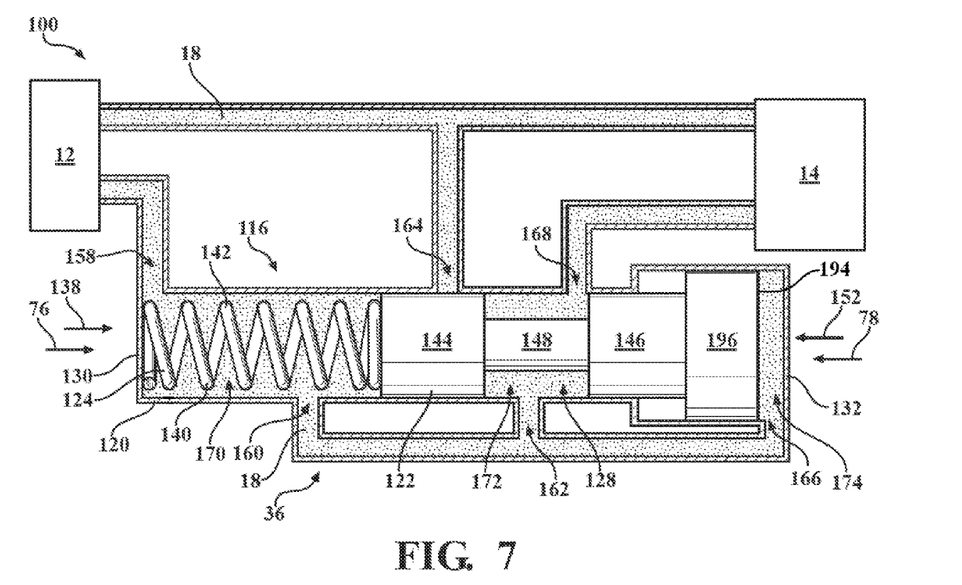
FIG. 7 is a schematic cross-sectional view of the valve of FIG. 5, shown in the second position.

Referring now to the valve 116 shown in the transmission fluid circuit 100 of FIGS. 6 and 7, the actuator 124 is a coil spring 142 that includes the SMA material 40. The spool 122 is disposed in the cavity 128 and is movable longitudinally therein between the first position 34, shown in FIG. 6, and the second position 36, shown in FIG. 7. The coil spring 142 is operatively disposed within the cavity 128 and is configured to act on the spool 122. The spool 122 includes a first section 144, a second section 146, a third section 196, and an intermediate section 148. The first section 144 is longitudinally spaced from the second section 146. The intermediate section 148 connects the first section 144 to the second section 146.

The third section 196 is longitudinally disposed adjacent the second section 146, longitudinally opposite the intermediate section 148. The first section 144 and the second section 146 are radially sized to fit within the cavity 128 such that the fluid 18 is prevented from passing within the cavity 128 between the first section 144 or the second section 146 and the housing 120. The intermediate section 148 is radially sized to be smaller than the first section 144 and second section 146 such that the fluid 18 is allowed to flow radially about the intermediate section 148, between the intermediate section 148 and the housing 120. The coil spring 142 is operatively disposed in the cavity 128 between the first section 144, opposite the intermediate section 148, and the second end 132 of the housing 120. The coil spring 142 is configured to act on the first section 144 and apply the first force 138 in the first longitudinal direction 76.

The housing 120 defines a first inlet 158, a first outlet 160, a second inlet 162, a second outlet 164, a third inlet 166, and a third outlet 168 that are each in fluid communication with the cavity 128. The first inlet 158 provides fluid communication from the transmission 12 to a first portion 170 of the cavity 128 that is defined between the first section 144 and the first end 130 of the housing 120, opposite the intermediate section 148. The first outlet 160 provides fluid communication from the first portion 170 of the cavity 128 to each of the second inlet 162 and the third inlet 166. The second inlet 162 provides fluid communication from the first outlet 160 to a second portion 172 of the cavity 128 defined between the first section 144 and the second section 146. The third inlet 166 provides fluid communication from the first outlet 160 to a third portion 174 of the cavity 28 that is defined between the third section 196 and the second end 132 of the housing 120. The second outlet 164 provides fluid communication from the second portion 172 of the cavity 128 to only the transmission 12 when the spool 122 is in the first position 34, as shown in FIG. 6. The third outlet 168 provides fluid communication from the second portion 172 of the cavity 128 to the cooler 14 when the spool 122 is in the second position 36, as shown in FIG. 7. In the second position 36, once the fluid 18 passes through the cooler 14, the fluid 18 then flows to the transmission 12. More specifically, when the spool 122 is in the first position 34, shown in FIG. 6, the second section 146 of the spool 122 blocks the third outlet 168, while leaving the second outlet 164 open to allow fluid communication from the second portion 172 of the cavity 128 to the transmission 12. Likewise, when the spool 122 is in the second position 36, shown in FIG. 7, the first section 144 of the spool 122 blocks the second outlet 164, while leaving the third outlet 168 open to allow fluid communication from the second portion 172 of the cavity 128 to the cooler 14.

The coil spring 142 is disposed in the first portion 170 of the cavity 128 and is also in fluid communication with the fluid 18 disposed in the first portion 170 of the cavity 128. When the fluid 18 is at a temperature that is a sufficient number of degrees less than the first temperature, the coil spring 142 is deactivated. Likewise, when the fluid 18 is at a temperature that is greater than the first temperature, the coil spring 142 is activated.

The third section 196 of the spool 122 is radially sized to be larger than the first section 144, the second section 146, and the intermediate section 148. The third section 196 may be radially sized to fit within the third portion 174 of the cavity 128 such that the fluid 18 is prevented from passing within the cavity 128, between the third section 196 and the housing 128. Therefore, the third portion 174 of the cavity 128 is radially sized to be larger than the cavity 128 corresponding to the first portion 170 and the second portion 172.

Referring specifically to FIG. 6, the fluid 18 is at a temperature that is a sufficient number of degrees less than the first temperature and the coil spring 142 is deactivated, such that the coil spring 142 is longitudinally contracted. The contracted coil spring 142 acts on the first section 144 of the spool 122 in the first longitudinal direction 76 with a first force 138 while a pressure of the fluid 18 in the third portion 174 of the cavity 128 acts on an area 194 of the third section 196 to provide a second force 152 acting in a second longitudinal direction 78, opposite the first longitudinal direction 76, where the second force 152, is greater than the first force 138 of the coil spring 142, to maintain the spool 122 in the first position 34. In the first position 34, the fluid 18 flows out of the first portion 170 of the cavity 128, through the first outlet 160, and into the second portion 172 of the cavity 128, through the second inlet 162, and the third portion 174 of the cavity 128, back through the third inlet 166. The fluid 18 flows out of the second portion 172 of the cavity 128, through the second outlet 164, and back into the transmission 12. Therefore, in the first position 34, the fluid 18 is prevented from flowing from the cavity 128 and into the cooler 14. Additionally, the actuator 124, including the SMA material 40, is totally immersed in the flowing fluid 18 such that the temperature is even across the whole actuator 124 and is always equal to the temperature of the fluid 18.

Referring to FIG. 7, the fluid 18 is at a temperature that is at least equal to the first temperature and the coil spring 142 is activated. Since the temperature of the fluid 18 is at least equal to the first temperature, the coil spring 142 is activated and longitudinally expands, increasing the magnitude of the first force 138 such that the first force 138 is greater than the second force 152, resulting from the fluid 18 acting on the area 194 of the third section 196. The coil spring 142 acts on the first section 144 of the spool 122 in the first longitudinal direction 76 with the first force 138 while the fluid 18 acts on the area 194 of the third section 196 with the second force 152, which is less than the first force 138 of the coil spring 142, to move the spool 122 in the first longitudinal direction 76 and to maintain the spool 122 in the second position 36. Therefore, the first force 138 of the coil spring 142 acting on the first section 144 of the spool 122 overcomes the second force 152 resulting from the fluid 18 acting on the area 194 of the third section 196 of the spool 122 to move the spool 122 in the first longitudinal direction 76 from the first position 34 to the second position 36. In the second position 36, the fluid 18 flows out of the first portion 170 of the cavity 128, through the first outlet 160, and back into the second portion 172 of the cavity 128, through the second inlet 162, and back out of the third portion 174 of the cavity 128, through the third inlet 166. The fluid 18 flows out of the second portion 172 of the cavity 128, through the third outlet 168, and into the cooler 14. The fluid 18 that flows through the fluid cooler 14 is cooled by the cooler 14 and then flows from the cooler 14, back into the transmission 12. When the spool 122 is in the second position 36, the first section 144 blocks the second outlet 164 such that the fluid 18 is prevented from flowing directly from the cavity 128 back into the transmission 12.

Additionally, referring again to FIG. 7, when the valve 116 is in the second position 36, the third portion 174 of the cavity 128 provides pressure relief to the transmission fluid circuit 100 if there is blockage in the cooler 14 of the transmission fluid circuit 100. If there is a pressure build up in the fluid circuit 100 as a result of the blockage in the cooler 14, the valve 116 will move from the second position 36 (FIG. 7) to the first position 34 (FIG. 6), regardless of the temperature of the fluid 18. More specifically, when the valve 116 is in the second position 36, and a second pressure of the fluid 18 acting on the area 194 of the third section 196 becomes too high, i.e., the pressure increases above a maximum threshold, this indicates that there is a blockage in the transmission fluid circuit 10, and the second force 152 moves the valve 116 to the first position 34 by overcoming the activated coil spring 142 acting on the first section 144, to bypass the cooler 14.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A transmission fluid circuit configured for regulating the flow of a fluid, the transmission fluid circuit comprising:
   a transmission configured for receiving and expelling the fluid;
   a cooler configured for receiving and expelling the fluid to the transmission;
   a valve configured for directing the flow of fluid received from the transmission to one of the transmission and the cooler;
   wherein the valve includes:
      a housing defining a cavity extending longitudinally between a first end and a second end, wherein the cavity is configured for receiving and expelling the fluid;
      a spool disposed in the cavity and movable longitudinally therein between a first position and a second position;
      an actuator configured to be operatively disposed in fluid communication with the fluid;
      wherein the actuator is configured to regulate the flow of fluid into the cavity of the housing;
      wherein the actuator includes a smart material configured to be activated in response to the temperature of the fluid exhibiting at least a first temperature such that activation of the smart material causes the actuator to be in a first state, whereby the spool is movable to the second position;
      wherein the smart material is configured to be deactivated in response to the fluid being a sufficient number of degrees less than the first temperature such that the smart material causes the actuator to be in a second state, whereby the spool is movable to the first position;
   a first fluid passage operatively disposed to provide fluid communication between the valve and the transmission;
   a second fluid passage operatively disposed to provide fluid communication between the housing and the first fluid passage;
   wherein the fluid is permitted to flow from the cavity to the transmission and from the transmission to the cavity when the spool is in the first position;
   wherein the actuator permits the fluid to flow from the second fluid passage into the cavity when the actuator is activated such that the fluid in the cavity acts on the spool to move the spool from the first position to the second position; and
   wherein the fluid is permitted to flow from the cavity to the cooler and from the cooler to the transmission when the spool is in the second position.

2. A transmission fluid circuit, as set forth in claim 1, wherein the spool includes:
   a first section;
   a second section longitudinally spaced from the first section; and
   an intermediate section longitudinally disposed between the first section and the second section;
   wherein the first section and the second section are radially sized to fit within the cavity such that fluid is prevented from passing within the cavity between each of the first section and the second section and the housing; and
   wherein the intermediate section is radially sized to be smaller than the first section and the second section such that the fluid is allowed to flow radially about the intermediate section and the housing, between the first section and the second section.

3. A transmission fluid circuit, as set forth in claim 1, wherein the actuator is operatively disposed in the second fluid passage;
   wherein the smart material is configured to be activated in response to the fluid in the second fluid passage being at least at the first temperature; and
   wherein the smart material is configured to be deactivated in response to the fluid in the second fluid passage being a sufficient number of degrees below the first temperature.

4. A transmission fluid circuit, as set forth in claim 3, wherein the fluid from the second fluid passage is permitted to act on the spool with a first force in a first longitudinal direction when the actuator is in the first state;
   wherein the valve further includes a first biasing device disposed in the cavity;
   wherein the first biasing device acts on the spool with a second force in a second longitudinal direction, opposite the first longitudinal direction;
   wherein the spool is configured to move in the first longitudinal direction from the first position to the second position when the first force, resulting from a pressure of the fluid acting on the spool in the first longitudinal direction, exceeds the second force of the first biasing device acting on the spool in the second longitudinal direction; and
   wherein the spool is configured to move in the second longitudinal direction from the second position to the first position when the first force, resulting from the pressure of the fluid acting on the spool in the first longitudinal direction, is less than the second force of the first biasing device acting on the spool in the second longitudinal direction.

5. A transmission fluid circuit, as set forth in claim 4, wherein the first end of the housing defines a first inlet;
   wherein the first inlet provides fluid communication between the cavity and the second fluid passage;
   wherein the actuator further includes a needle valve configured to close the first inlet when the smart material is deactivated such that the fluid is prevented from flowing through the first inlet from the second fluid passage into the cavity
   wherein the needle valve is configured to uncover the first inlet when the smart material is activated such that the fluid is permitted to flow through the first inlet from the second fluid passage into the cavity.

6. A transmission fluid circuit, as set forth in claim 5, wherein the actuator further includes:
   a second biasing device continuously biasing the needle valve toward the first inlet;
   a lever arm extending between a first lever end and a second lever end;
   wherein the lever arm is pivotally connected to the needle valve proximate the first lever end,
   wherein the lever arm is pivotally connected to the second fluid passage at a pivot location disposed between the first lever end and the second lever end;

wherein the lever arm is operatively attached to the smart material, proximate the second lever end.

7. A transmission fluid circuit, as set forth in claim 6, wherein the second fluid passage includes a first passage portion and a second passage portion;
   wherein the first passage portion extends in generally parallel relationship to the housing and is in fluid communication with the first fluid passage;
   wherein the second passage portion extends in generally perpendicular relationship to the first passage portion and is in fluid communication with the first passage portion and the first inlet;
   wherein the smart material is operatively disposed in the first passage portion; and
   wherein each of the needle valve, the second basing device, and the lever arm are operatively disposed in the second passage portion.

8. A transmission fluid circuit, as set forth in claim 2, wherein the fluid is permitted to flow from the first fluid passage, into the cavity between the first section and the second section, and out of the cavity, into the cooler, when the spool is in the second position.

9. A transmission fluid circuit, as set forth in claim 8, wherein the fluid is permitted to flow from the first fluid passage, into the cavity between the first section and the second section, and out of the cavity, into the transmission, when the spool is in the first position.

10. A transmission fluid circuit, as set forth in claim 4, wherein the spool is movable longitudinally in the cavity between the first position, the second position, and a third position;
    wherein the second position is operatively disposed between the first position and the third position; and
    wherein the actuator permits the fluid to flow from the cavity to the transmission and from the transmission to the cavity when the spool is in the third fluid position.

11. A transmission fluid circuit, as set forth in claim 10, wherein the spool moves in the first longitudinal direction from the second position to the third position when a force resulting from a pressure of the fluid acting on the spool in the first longitudinal direction exceeds a force of the first biasing device acting on the spool in the second longitudinal direction.

12. A transmission fluid circuit, as set forth in claim 1, wherein the smart material is a wire.

13. A transmission fluid circuit, as set forth in claim 1, wherein the smart material is entirely immersed in the fluid such that the temperature of the entire smart material is equal to the temperature of the fluid within the second fluid passage.

14. A transmission fluid circuit, as set forth in claim 2, wherein the actuator is disposed in the cavity and longitudinally reacts between the first section of the spool and the first end of the housing.

15. A transmission fluid circuit, as set forth in claim 14, wherein the fluid acts on the second section of the spool, opposite the first section, as the actuator is acting on the first section of the spool;
    wherein the spool moves in the first longitudinal direction from the first position to the second position when a force resulting from the actuator acting on the first section of the spool in the first longitudinal direction exceeds a force resulting from the fluid acting on the second section of the spool in the second longitudinal direction;
    wherein the spool moves in the second longitudinal direction from the second position to the first position when the force resulting from the actuator acting on the spool in the first longitudinal direction is less than the force resulting from the fluid acting on the second section of the spool in the second longitudinal direction.

16. A transmission fluid circuit, as set forth in claim 1, wherein the actuator is a coil spring.

17. A transmission fluid circuit comprising:
   a transmission configured for receiving and expelling a fluid;
   a cooler configured for receiving and expelling the fluid to the transmission;
   a valve configured for directing the flow of fluid received from the transmission to one of the transmission and the cooler;
   a first fluid passage operatively disposed to provide fluid communication between the valve and the transmission;
   a second fluid passage operatively disposed to provide fluid communication between the housing and the first fluid passage;
   wherein the valve includes:
      a housing defining a cavity extending longitudinally between a first end and a second end, wherein the cavity is configured for receiving and expelling the fluid;
      a spool disposed in the cavity and movable longitudinally therein between a first position and a second position;
      an actuator operatively disposed in the second fluid passage;
      wherein the actuator is in fluid communication with the fluid and the actuator is configured to regulate the flow of fluid into the cavity of the housing;
      wherein the actuator includes a smart material configured to be activated in response to the temperature of the fluid in the second fluid passage exhibiting at least a first temperature such that activation of the smart material activates the actuator;
      wherein the smart material is configured to be deactivated in response to the fluid in the second fluid passage being a sufficient number of degrees less than the first temperature such that the smart material deactivates the actuator;
      wherein the actuator permits the fluid to flow from the second fluid passage into the cavity when the actuator is activated such that the fluid in the cavity acts on the spool to move the spool from the first position to the second position;
      wherein the fluid is permitted to flow from the cavity to the transmission and from the transmission to the cavity when the spool is in the first position; and
      wherein the fluid is permitted to flow from the cavity to the cooler and from the cooler to the cavity when the spool is in the second position.

18. A transmission fluid circuit comprising:
   a transmission configured for receiving and expelling a fluid;
   a cooler configured for receiving and expelling the fluid to the transmission;
   a valve configured for directing the flow of fluid received from the transmission to one of the transmission and the cooler;
   a first fluid passage operatively disposed to provide fluid communication between the valve and the transmission;
   a second fluid passage operatively disposed to provide fluid communication between the housing and the first fluid passage;

wherein the valve includes:
a housing defining a cavity extending longitudinally between a first end and a second end, wherein the cavity is configured for receiving and expelling the fluid;
wherein the first end of the housing defines a first inlet which provides fluid communication between the cavity and the second fluid passage;
a spool disposed in the cavity and movable longitudinally therein between a first position and a second position;
a needle valve disposed in the second fluid passage and configured to cover and uncover the first inlet to allow the fluid to flow from the second fluid passage into the cavity only when the needle valve uncovers the first inlet;
a wire disposed in the first fluid passage and operatively attached to the needle valve;
wherein the wire is in fluid communication with the fluid;
wherein the wire includes a smart material configured to be activated in response to the temperature of the fluid in the second fluid passage exhibiting at least a first temperature such that activation of the smart material activates the wire and moves the needle valve and uncover the first inlet to allow the fluid to enter the cavity and act on the spool to move the spool from the first position to the second position;
wherein the smart material is configured to be deactivated in response to the fluid in the second fluid passage being a sufficient number of degrees less than the first temperature such that the smart material deactivates the wire and the needle valve covers the first inlet and fluid is prevented from entering the cavity from the first inlet and the spool moves from the second position to the first position;
wherein the fluid is permitted to flow from the cavity to the transmission and from the transmission to the cavity when the spool is in the first position; and
wherein the fluid is permitted to flow from the cavity to the cooler and from the cooler to the transmission when the spool is in the second position.

* * * * *